US006539383B2

(12) United States Patent
Charlet et al.

(10) Patent No.: US 6,539,383 B2
(45) Date of Patent: *Mar. 25, 2003

(54) COMMUNICATION AND INTERACTION OBJECTS FOR CONNECTING AN APPLICATION TO A DATABASE MANAGEMENT SYSTEM

(75) Inventors: Kyle Jeffrey Charlet, Morgan Hill, CA (US); Haley Hoi Lee Fung, San Jose, CA (US); Judith Eleanor Hill, San Jose, CA (US); Gerald Dean Hughes, Morgan Hill, CA (US); Steve T. Kuo, San Jose, CA (US); Wai-Yee Doris Ling, Cupertino, CA (US); Moncrief Rowe-Anderson, San Jose, CA (US); Jack Chiu-Chiu Yuan, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,150

(22) Filed: Nov. 8, 1999

(65) Prior Publication Data

US 2002/0143721 A1 Oct. 3, 2002

(51) Int. Cl.[7] .............................................. G06F 17/30
(52) U.S. Cl. ....................... 707/10; 707/3; 707/103 R; 717/118
(58) Field of Search ...................... 707/1–4, 100–104.1, 707/10; 717/118

(56) References Cited

U.S. PATENT DOCUMENTS

| 5,093,787 A | * | 3/1992 | Simmons ..................... 235/379 |
| 5,530,857 A | * | 6/1996 | Gimza .......................... 707/10 |
| 5,706,429 A | * | 1/1998 | Lai et al. ..................... 359/467 |

(List continued on next page.)

OTHER PUBLICATIONS

Harding, Elizabeth U., "Older Databases Hang In", Jul. 1995, Software Magazine, vol. 15, No. 7, p. 22.*
IMS TOC CONNECTOR FOR JAVA, User's Guide, Version 1, IBM Corporation, Dec. 1998, (see entire doucument).

*Primary Examiner*—John Breene
*Assistant Examiner*—Harold E. Dodds, Jr.
(74) *Attorney, Agent, or Firm*—Gates & Cooper LLP

(57) ABSTRACT

A method, apparatus, and article of manufacture for accessing a database management system. A database management system (DBMS), executed by a server computer, manages one or more datastores stored on the computer. The DBMS includes an Open Transaction Manager Access (OTMA) that provides a high level application programming interface (API) for an application program to access the DBMS and its datastores, wherein the OTMA allows the application program to create an authorized connection with the DBMS. The server computer also executes a TCP/IP OTMA Connection (TOC) that establishes and manages connections between the DBMS and the application program. In the preferred embodiment, the application comprises a Java servlet or applet executed by a Java Virtual Machine JVM). A TOC Connector for Java interfaces the JVM to the TOC, wherein the TOC Connector for Java includes one or more objects for establishing a connection between an applet or servlet executed by the JVM and the OTMA of the DBMS, so that transactions can be transmitted from the application program to the DBMS over the established connection and results of the transmitted transactions can be received at the application from the DBMS.

42 Claims, 3 Drawing Sheets

U.S. PATENT DOCUMENTS

| | | | |
|---|---|---|---|
| 5,754,772 A | 5/1998 | Leaf | 395/200.33 |
| 5,754,830 A | 5/1998 | Butts et al. | 395/500 |
| 5,758,186 A | 5/1998 | Hamilton et al. | 395/831 |
| 5,826,270 A * | 10/1998 | Rutkowski et al. | 707/10 |
| 5,842,174 A * | 11/1998 | Yanor | 705/1 |
| 5,892,957 A * | 4/1999 | Normoyle et al. | 710/260 |
| 5,899,990 A | 5/1999 | Maritzen et al. | 707/4 |
| 5,918,228 A * | 6/1999 | Rich et al. | 345/742 |
| 6,128,622 A * | 10/2000 | Bach et al. | 707/102 |
| 6,199,195 B1 * | 3/2001 | Goodwin et al. | 707/100 |
| 6,230,160 B1 * | 5/2001 | Chan et al. | 707/102 |
| 6,236,999 B1 * | 5/2001 | Jacobs et al. | 707/10 |
| 6,263,498 B1 * | 7/2001 | Alcorn et al. | 717/110 |
| 6,336,118 B1 * | 1/2002 | Hammond | 707/101 |
| 6,356,931 B2 * | 3/2002 | Ismael et al. | 709/202 |

* cited by examiner

COMMUNICATION AND INTERACTION OBJECTS FOR CONNECTING AN APPLICATION TO A DATABASE MANAGEMENT SYSTEM

CROSS-REFERENCE TO RELATED APPLICATION

This application is related to the following co-pending and commonly-assigned patent applications:

U.S. patent application Ser. No. 09/436,779, entitled "SYSTEM MESSAGE OBJECTS FOR COMMUNICATING BETWEEN AN APPLICATION AND A DATABASE MANAGEMENT SYSTEM" filed on same date herewith, by Haley Fung, Judith E. Hill, and Steve T. Kuo,;

U.S. patent application Ser. No. 09/342,010, entitled "APPLICATION PROGRAMMING INTERFACE FOR CREATING AUTHORIZED CONNECTIONS TO A DATABASE MANAGEMENT SYSTEM", filed by Gerald L. Carpenter, Richard D. Housh, Steve T. Kuo, Bruce E. Naylor, Richard L. Stone, and Jack C. Yuan, on Jun. 28, 1999,;

which applications are incorporated by reference herein.

BACKGROUND OF THE INVENTION

1. Field of the Invention

The present invention relates generally to computerized methods for accessing databases, and in particular, to communication and interaction objects for connecting an application to a database management system.

2. Description of Related Art

It is well known in the art to use database management systems, such as IBM's IMS (Information Management System) database management system (DRMS), to manage computerized databases. Indeed, IMS has been used for decades and remains in use today. Currently, there is a need to access such "legacy" databases using application programs. However, such tasks are complex and there are few tools available to assist application program developers.

IMS Open Transaction Manager Access (OTMA) is a high performance client/server protocol that allows application programs to access an IMS DBMS. However, the application program must include an interface to the IMS OTMA, which can be difficult to develop. To interface with an IMS DBMS requires rather extensive knowledge of the architecture of the IMS DBMS, as well as the architecture of the MVS operating system. Moreover, because of security considerations with regard to accessing an IMS DBMS, a great deal of skill is involved in establishing a connection between an application program and the IMS DBMS, since it must interface with the operating system as a secure and trusted "user".

In order to more fully provide access to an IMS DBMS, it would be advantageous to have an easier mechanism to connect to the IMS DBMS and run transactions thereby. Thus, there is a need in the art for improved techniques for accessing a hierarchical database management system.

SUMMARY OF THE INVENTION

To overcome the limitations in the prior art described above, and to overcome other limitations that will become apparent upon reading and understanding the present specification, the present invention discloses a method, apparatus, and article of manufacture for accessing a database management system. A database management system (DBMS), executed by a server computer, manages one or more datastores stored on the computer. The DBMS includes an Open Transaction Manager Access (OTMA) that provides a high level application programming interface (API) for an application program to access the DBMS and its datastores, wherein the OTMA allows the application program to create an authorized connection with the DBMS. The server computer also executes a TCP/IP OTMA Connection (TOC) that accepts and manages connections between the DBMS And the application program. In the preferred embodiment, die application comprises a JAVA servlet or applet executed by a JAVA Virtual Machine (JVW). A TOC Connector for JAVA interfaces the JVM to the TOC, wherein the TOC Connector for JAVA includes one or more objects for establishing a connection between the servlet or applet executed by the JVM and the OTMA of the DBMS, so that transactions can be transmitted from the application program to the DBMS over the established connection and results of the transmitted transactions can be received at the application from the DBMS.

Various advantages and features of novelty, which characterize the invention, are pointed out with particularity in the claims annexed hereto and form a part hereof However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown byway of illustration a specific embodiment in which the invention may be practiced. It is to be understood that other embodiments may be utilized and structural changes may be made without departing from the scope of the present invention.

Overview

The IMS Open Transaction Manager Access (OTMA) provides a high level application programming interface (API) for application programs to access an IMS database management system (DBMS) and its datastores. The IMS OTMA also provides easy access to an IMS datastore by creating an "authorized" path to or connection with the IMS database. As a result, application programs accessing the data in the IMS DBMS can be more readily written by programmers having less familiarity with the internals of the IMS DBMS and operating system.

With this simple and easy to use interface, an application program can submit a transaction or command to the IMS DBMS and receive the results therefrom without the necessity of understanding protocols of the IMS OTMA. Thus, the present invention offers improved IMS application programming productivity

Hardware and Software Environment

Figure 1:
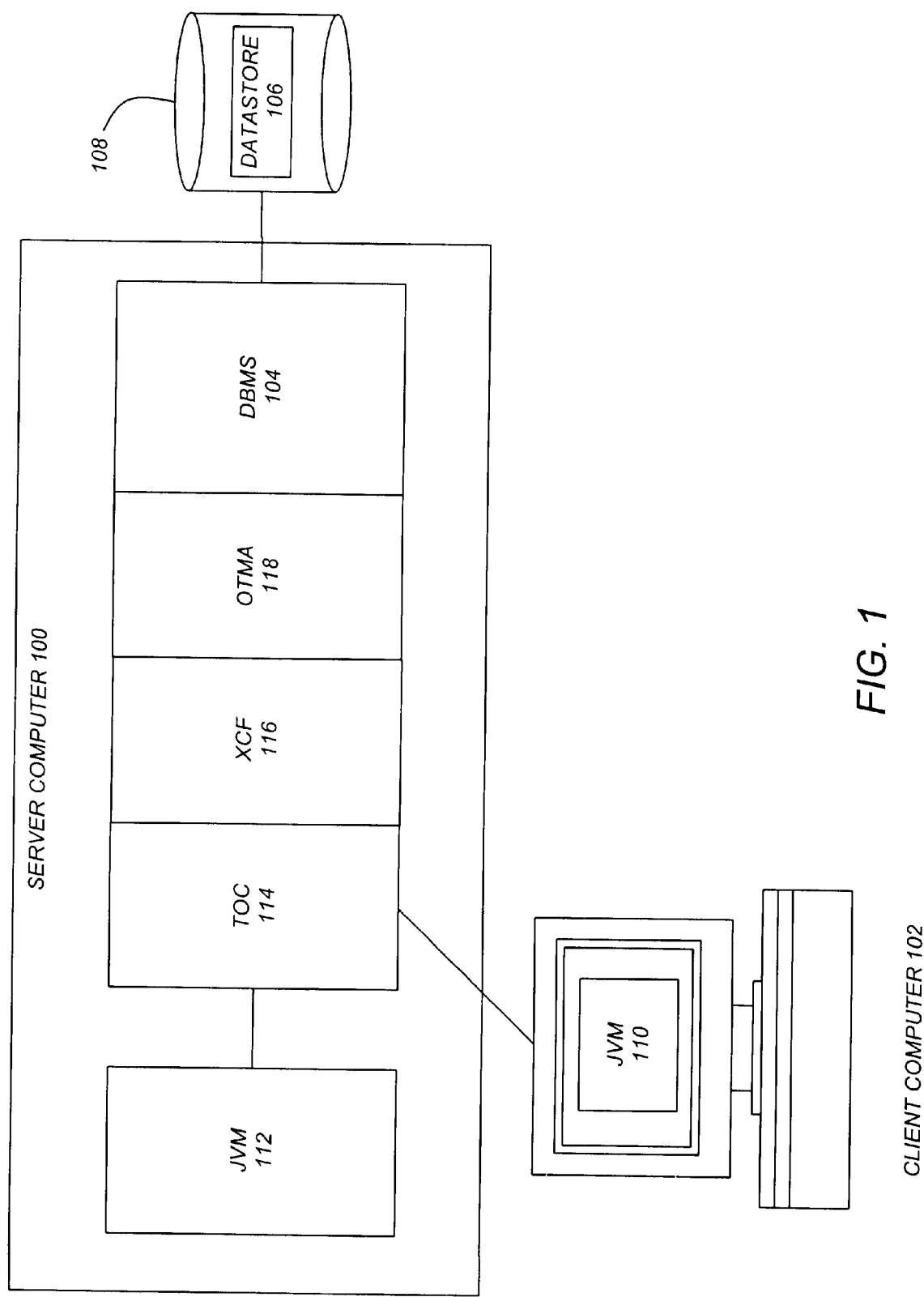
FIG. 1 is a block diagram illustrating an exemplary hardware and software environment used to implement the preferred embodiment of the present invention.

FIG. 1 is a block diagram illustrating an exemplary hardware and software environment used to implement the preferred embodiment of the invention. The environment includes one or more server computers 100 and, optionally, one or more client computers 102. Both the server computers 100 and client computers 102 typically are comprised of one or more processors, random access memory (RAM), read-only memory (ROM), and other components such as data storage devices and data communications devices.

The server computer 100 executes a database management system (DBMS) 104, which in the preferred embodiment comprises the Information Management System (IMS) DBMS sold by IBM Corporation, the assignee of the present invention. The IMS DBMS 104 manages one or more datastores 106 stored on one or more data storage devices 108. The datastore 106 comprises a hierarchic collection of data, wherein information is organized in a pyramid fashion with data at each level of the hierarchy related to, and in some way dependent upon, data at the higher level of the hierarchy.

According to the preferred embodiment of the present invention, applets are executed by a JAVA Virtual Machine (JVM) 110 executed by the client computer 102 and/or servlets are executed by a JVM 112 executed by the server computer 100. The JVM 110, 112 interfaces to the IMS DBMS 104 via an IMS TCP/IP OTMA Connection (TOC) 114, which connects to a Cross-Coupling Facility (XCF) 116, that in turn interfaces to an IMS Online Transaction Manager Access (OTMA) 118, which comprises an application programming interface (API) to the IMS DBMS 104. These various components perform these various steps in order to establish a connection between the JVM 110, 112 and the IMS DBMS 104, send transactions from the JVM 110, 112 to the IMS DBMS 104 over the established connection, and receive results of the transactions from the IMS DBMS 104 at the JVM 110, 112 over the established connection.

Generally, these components 104, 106, 110, 112, 114, 116, and 118 all comprise logic and/or data that is embodied in or accessible from a device, medium, or carrier, e.g., a data storage device, a data communications device, a remote computer or device coupled to the computer via a data communications device, etc. Moreover, this logic and/or data, when read, executed, and/or interpreted by a computer, causes the computer to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize that any combination of the above components, or any number of different components, including different logic, data, different computers, devices, or peripherals, may be used to implement the present invention, so long as similar functions are performed thereby. Specifically, those skilled in the art will recognize that the present invention may be applied to any database and associated database management system.

Overview of IMS TOC Connector for Java

Figure 2:
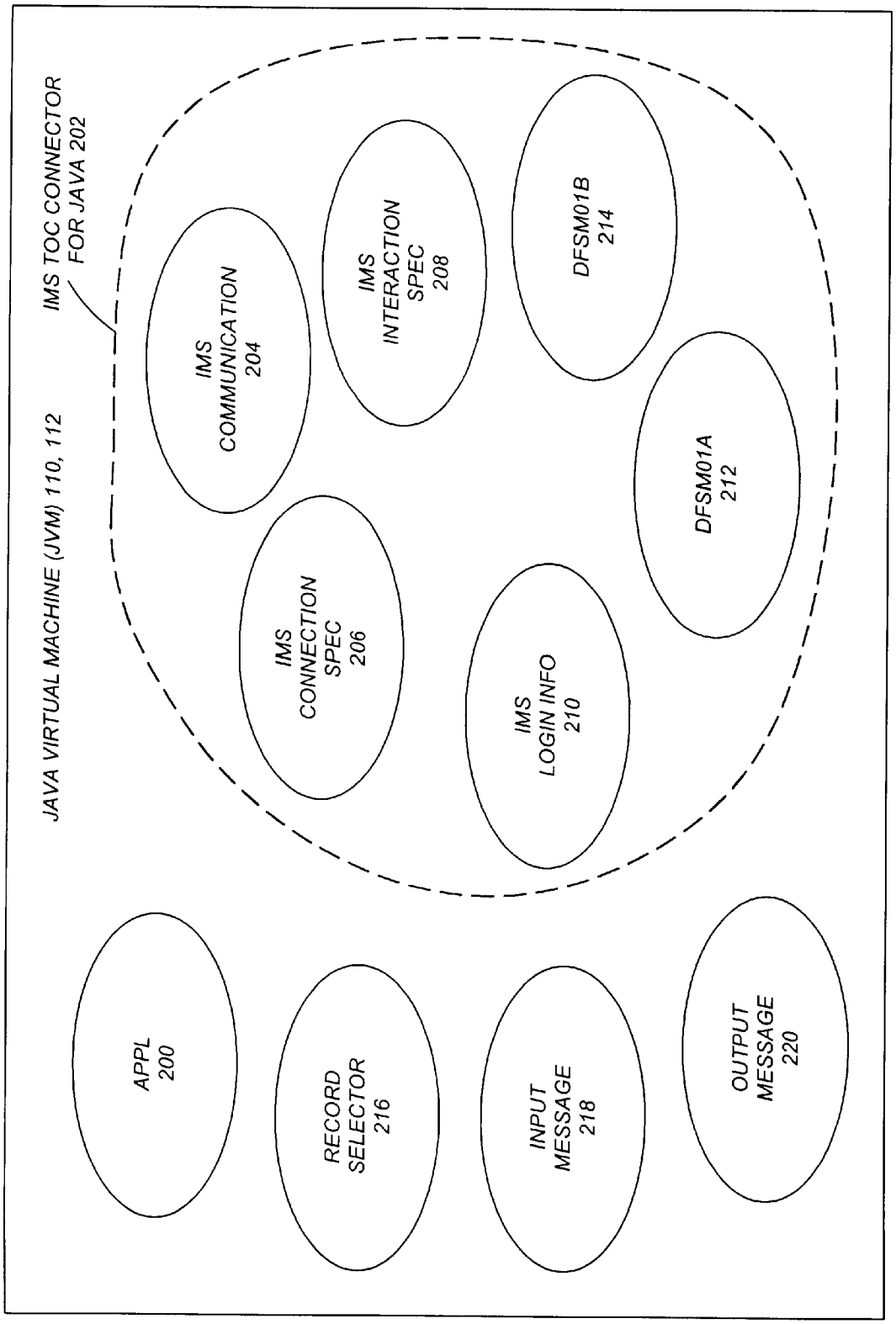
FIG. 2 is a block diagram illustrating an exemplary logical structure of the preferred embodiment of the present invention.

FIG. 2 is a block diagram that illustrates the components and structure of the components executed by the JVM 110, 112 according to the preferred embodiment of the present invention. The JVM 110,112 executes one or more JAVA applications 200 (either applets or servlets), which interface to an IMS TOC Connector for JAVA 202 executed by the JVM 110, 112. In essence, the IMS TOC Connector for JAVA 202 allows the application program 200 to act as a TCP/IP client to the IMS TOC 114 executed by the server computer 100.

The IMS TOC Connector for JAVA 202 includes the following classes (which are instantiated as Java Beans):

- An IMS Communication bean 204 representing the communications session established between the application program 200 and the IMS TOC 114, as well as the target IMS DBMS 104 and IMS datastore 106.
- An IMS Connection Spec bean 206 representing the connection between the application program 200 and the IMS TOC 114, as well as the target IMS DBMS 104 and IMS datastore 106.
- An IMS Interaction Spec bean 208 representing the type of interaction that the application program 200 has with the IMS TOC 114, as well as the target IMS DBMS 104 and IMS datastore 106.
- An IMS Logon Info bean 210 representing Logon information for the duration of a session.
- A DFSMO1A bean 212 and a DFSMO1B bean 214 to process potential error messages returned from the IMS DBMS 104. These messages begin with the three characters "DFS."

The application program 200 is developed using a programming development tool (such as IBM's VISUAL AGE FOR JAVA). In addition to interfacing with the above beans, the application is usually a composite "bean" that includes the following:

- A Record Selector bean 216 that discriminates between normal input/output messages and error messages.
- An Input Message bean 218 representing the input to the IMS transaction.
- An Output Message bean 220 representing the output from the IMS transaction.
- Generally, these components 200, 202, 204, 206,208, 210, 212, 214, 216, 218, and 220 all comprise logic and/or data that is embodied in or accessible from a device, medium, or carrier, e.g., a data storage device, a data communications device, a remote computer or device coupled to the computer via a data communications device, etc. Moreover, this logic and/or data, when read, executed, and/or interpreted by a computer, causes the computer to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize that any combination of the above components, or any number of different components, including different logic, data, different computers, devices, or peripherals, may be used to implement the present invention, so long as similar functions are performed thereby. Specifically, those skilled in the art will recognize that the present invention may be applied to any database and associated database management system.

Logic of the Preferred Embodiment

Figure 3:
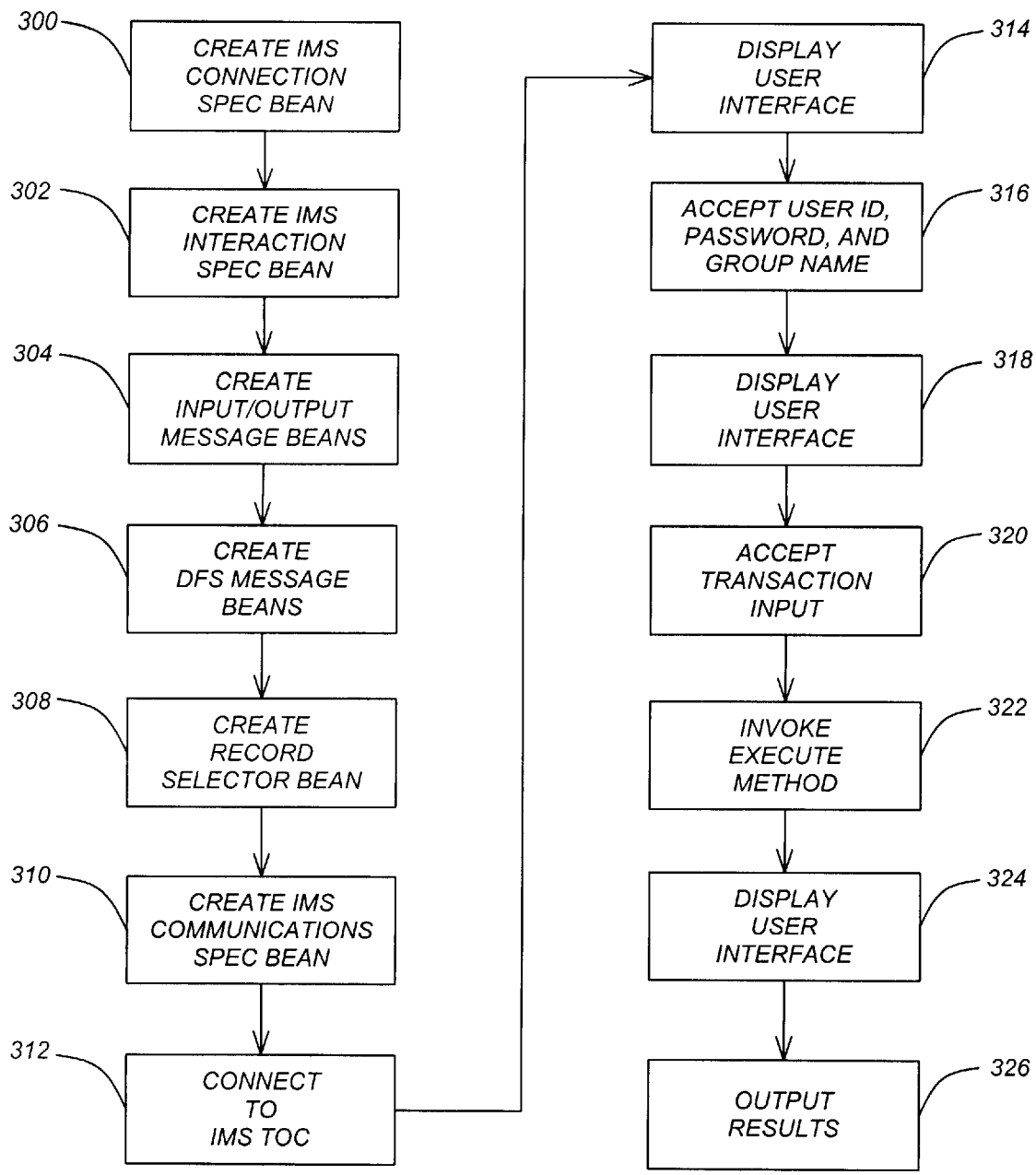
FIG. 3 is a flowchart illustrating the logic performed according to the preferred embodiment of the present invention.

FIG. 3 is a flowchart that illustrates the logic performed according to the preferred embodiment of the present invention. Essentially, this logic provides a high-level overview of how to build and operate a JAVA application program 200 that accesses an IMS transaction.

Block 300 represents the creation of an IMS Connection Spec bean 206 to be used for the connection to IMS TOC 114. The IMS Connection Spec bean 206 provides information about the TCP/IP connection between the application program 200 and the IMS TOC 114, as well as information about connection management.

The following information is provided to the IMS Connection Spec object 206:

TCP/IP hostname of the server computer 100 running IMS TOC 114 that will be used by the application program 200, and Port number associated with IMS TOC 114 that will be used by the application program 200.

Block 302 represents the creation of an IMS Interaction Spec bean 208 to be used for the interaction between the Java application program 200 and the IMS DBMS 104. The IMS Interaction Spec bean 208 provides information about the interaction between the application program 200 and the IMS DBMS 104.

The following information is provided to the IMS Interaction Spec bean 208:

Datastore Name—The name of the target IMS datastore 106.

LTerm Name—The LTERM (Logical Terminal) name used to override the LTERM name associated with the application program 200 in the IMS DBMS 104.

Map Name—The map name is provided by the application program 200 to identify the output of a transaction.

Mode—The Mode identifies the type of interaction to be carried out between the application program 200 and the IMS DBMS 104. The default mode is MODE_SEND_RECEIVE.

Sync Level—The Sync Level specifies the transaction synchronization level that the application program 200 is to have with IMS OTMA 118.

Block 304 represents the creation of Input/Output Message beans 218, 220 to represent the input and the output to the IMS transaction. In a preferred embodiment, COBOL source files that contain definitions of the IMS transaction input and output messages are parsed in order to generate these corresponding beans 218, 220.

Message segments that are sent to and received from IMS transactions always begin with a 2-byte length field (called LL), followed by a 2-byte field that contains IMS information (called ZZ). The 2-byte length field represents the length of the entire message segment, including the LL and ZZ fields. The data of the message segment follows the LL and ZZ fields. In the case of the first segment of the transaction's input message, the data portion of the segment also contains the transaction code. The application program 200 must set the fields of a transaction input message segment before sending that segment to the IMS DBMS 104.

Block 306 represents the creation of DFS beans 214, 216 to represent IMS DFS messages, i.e., the DFSMO1A and DFSMO1B beans 214, 216. The DFSMO1A and DFSMO1B beans 214, 216 together represent IMS error messages that may be returned by the IMS DBMS 104 in response to a command or a transaction. These messages typically begin with the characters DFS, and might or might not indicate an error situation. Because the characters DFS are sometimes preceded by a control character, two output beans PFSMO1A bean 212 and DFSMO1B bean 214) are used to handle these IMS DFS messages. Both DFS beans 214, 216 provide a getDFSMessage ( ) method to access the message, starting with the DFS prefix.

Block 308 represents the creation of a Record Selector bean 212 that is used by the application program 200 to choose between the output of the IMS transaction or IMS command, and the two forms of IMS DFS messages. The Record Selector bean 212 populates the appropriate bean 214, 216, or 220 based on the message that is returned from the IMS DBMS 104.

Block 310 represents the creation of an IMS Communication bean 204 and Block 312 represents the connection of the application program 200 to the IMS TOC 114 by invoking a connect method of the IMS Communication bean 204.

Blocks 314, 316 represent the application program 200 displaying a user interface and accepting input from the user interface, so that a user ID, password, and group name can be provided for the IMS transaction. For example, if the JVM 110 is executed by a Web browser, and the application program 200 is an applet performed by the Web browser, then the input to the IMS transaction is provided by a Web browser in an input HTML page that is then provided to the applet. In an alternative example, if the JVM 112 is executed by a Web server, and the application program 200 is a servlet performed by the Web server, then the input to the IMS transaction is provided by a Web browser in an input HTML page that is transmitted to the Web server and provided to the servlet.

Blocks 318, 320 represent the application program 200 displaying a user interface and accepting input from the user interface, so that other input data can be provided for the IMS transaction.

Block 322 represents an IMS transaction being invoked by the application program 200. Generally, the transaction is invoked by an execute method of the application program 200 that uses the IMS TOC Connector 202 to submit a message to the IMS OTMA 118.

Blocks 324, 326 represent the application program 200 displaying a user interface and then displaying the output to the user interface, so that results data from the IMS transaction can be provided to the user. Usually, the results is translated into an HTML page that is displayed by a Web browser.

CONCLUSION

This concludes the description of the preferred embodiment of the invention. The following describes some alternative methods of accomplishing the same objects.

In alternative embodiments of the present invention, other types and configurations of computers could be used. For example, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems and databases.

In summary, the present invention discloses a method, apparatus, and article of manufacture for accessing a database management system. A database management system (DBMS), executed by a server computer, manages one or more datastores stored on the computer. The DBMS includes an Open Transaction Manager Access (OTMA) that provides a high level application programming interface (API) for an application program to access the DBMS and its datastores, wherein the OTMA allows the application program to create an authorized connection with the DBMS. The server computer also executes a TCP/IP OTMA Connection (TOC) that establishes and manages connections between the DBMS and the application program. In the preferred embodiment, the application comprises a JAVA servlet or applet executed by a JAVA Virtual Machine (JVM). A TOC Connector for JAVA interfaces the JVM to the TOC, wherein the TOC Connector for JAVA includes one or more objects for establishing a connection between an applet or servlet executed by the JVM and the OTMA of the DBMS, so that transactions can be transmitted from the application program to the DBMS over the established connection and results of the transmitted transactions can be received at the application from the DBMS.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for accessing a database management system, comprising:
   (a) a Connector, executed by a computer, for interfacing an application program to a database management system (DBMS),
   (b) wherein the DBMS includes an Open Transaction Manager Access (OTMA) that provides an application programming interface (API) for the application program to access the DBMS and its datastores, and the OTMA allows the application program to create an authorized connection with the DBMS,
   (c) wherein the Connector includes one or more objects for establishing a connection between the application program and the OTMA, for transmitting transactions from the application program to the DBMS over the established connection between an application program and the OTMA, and for receiving results of the transactions from the DBMS to the application program over the established connection between an application program and the OTMA, and
   (d) wherein the objects include a Connection Spec bean representing the connection between the application program and the OTMA, as well as the DBMS and its datastores, and an Interaction Spec bean representing the type of interaction that the application program has with the OTMA, as well as the DBMS and its datastores.

2. The apparatus of claim 1, wherein the Connector establishes a connection between the application program and the OTMA via a TCP/IP OTMA Connection (TOC).

3. The apparatus of claim 2, wherein the Connector comprises a TOC Connector.

4. The apparatus of claim 3, wherein the Connection Spec bean provides information about connection management between the application program and the TOC, as well as the DBMS.

5. The apparatus of claim 4, wherein the Connection Spec bean provides information about a TCP/IP connection between the application program and the TOC, as well as the DBMS.

6. The apparatus of claim 4, wherein the Connection Spec bean provides information selected from a group comprising:
   a TCP/IP hostname of a server computer, and
   a Port number associated with the DBMS.

7. The apparatus of claim 3, wherein the Interaction Spec bean provides information about the interaction between the application program and the TOC, as well as the OTMA and DBMS.

8. The apparatus of claim 7, wherein the Interaction Spec bean provides information selected from a group comprising:
   a Datastore Name that identifies a name of the datastore,
   an LTerm Name that identifies a name of a logical terminal,
   a Map Name that identifies output from a transaction,
   a Mode that identifies a type of interaction to be carried our between the application program and the DBMS,
   a Sync Level that specifies a transaction synchronization level between the application program and the DBMS.

9. The apparatus of claim 3, wherein the TOC Connector further comprises one or more of the objects selected from a group comprising:
   a Communication bean representing the communications between the application program and the TOC, as well as the DBMS and its datastores,
   a Logon Info bean representing logon information for the duration of a session between the application program and the TOC, as well as the DBMS and its datastores, and
   at least one bean for processing potential error messages returned from the DBMS to the application program.

10. The apparatus of claim 9, wherein the error messages are DFS messages.

11. The apparatus of claim 9, wherein the beans for processing potential error messages are used to handle differently formatted error messages.

12. The apparatus of claim 1, wherein the application program includes one or more of the objects selected from a group comprising:
   a Record Selector bean that discriminates between normal input/output messages and error messages,
   an Input Message bean representing the input to the transaction, and
   an Output Message bean representing the output from the transaction.

13. The apparatus of claim 12, wherein the Input Message bean is generated from one or more COBOL source files that contain definitions of the transactions.

14. The apparatus of claim 12, wherein the Output Message bean is generated from one or more COBOL source files that contain definitions of the transactions.

15. A method for accessing a database management system, comprising:
   (a) interfacing an application program to a database management system (DBMS) using a Connector executed by a computer, (b) wherein the DBMS includes an Open Transaction Manager Access (OTMA) that provides an application programming interface (API) for the application program to access the DBMS and its datastores, and the OTMA allows the application program to create an authorized connection with the DBMS, (c) wherein the Connector includes one or more objects for establishing a connection between the application program and the OTMA, for transmitting transactions from the application program to the DBMS over the established connection between an application program and the OTMA, and for receiving results of the transactions from the DBMS to the application program over the established connection between an application program and the OTMA, and (d) wherein the objects include a Connection Spec bean representing the connection between the application program and the OTMA, as well as the DBMS and its datastores, and an Interaction Spec bean representing the type of interaction that the application program has with the OTMA, as well as the DBMS and its datastores.

16. The method of claim 15, wherein the Connector establishes a connection between the application program and the OTMA via a TCP/IP OTMA Connection TOC).

17. The method of claim 16, wherein the Connector comprises a TOC Connector.

18. The method of claim 17, wherein the Connection Spec bean provides information about connection management between the application program and the TOC, as well as the DBMS.

19. The method of claim 18, wherein the Connection Spec bean provides information about a TCP/IP connection between the application program and the TOC, as well as the DBMS.

20. The method of claim 18, wherein the Connection Spec bean provides information selected from a group comprising:
   a TCP/IP hostname of a server computer, and
   a Port number associated with the DBMS.

21. The method of claim 17, wherein the Interaction Spec bean provides information about the interaction between the application program and the TOC, as well as the OTMA and DBMS.

22. The method of claim 21, wherein the Interaction Spec bean provides information selected from a group comprising:
   a Datastore Name that identifies a name of the datastore,
   an LTerm Name that identifies a name of a logical terminal,
   a Map Name that identifies output from a transaction,
   a Mode that identifies a type of interaction to be carried out between the application program and the DBMS,
   a Sync Level that specifies a transaction synchronization level between the application program and the DBMS.

23. The method of claim 17, wherein the TOC Connector further comprises one or more of the objects selected from a group comprising:
   a Communication bean representing the communications between the application program and the TOC, as well as the DBMS and its datastores,
   a Logon Info bean representing logon information for the duration of a session between the application program and the TOC, as well as the DBMS and its datastores, and
   at least one bean for processing potential error messages returned from the DBMS to the application program.

24. The method of claim 23, wherein the error messages are DFS messages.

25. The method of claim 23, wherein the beans for processing potential error messages are used to handle differently formatted error messages.

26. The method of claim 15, wherein the application program includes one or more of the objects selected from at group comprising:
   a Record Selector bean that discriminates between normal input/output messages and error messages,
   an Input Message bean representing the input to the transaction, and
   an Output Message bean representing the output from the transaction.

27. The method of claim 26, wherein the Input Message bean is generated from one or more COBOL source files that contain definitions of the transactions.

28. The method of claim 26, wherein the Output Message bean is generated from one or more COBOL source files that contain definitions of the transactions.

29. At least one article of manufacture embodying an apparatus for accessing a database management system, the apparatus comprising:

(a) a Connector, executed by a computer, for interfacing an application program to a database management system (DBMS), (b) wherein the DBMS includes an Open Transaction Manager Access (OTMA) than provides an application programming interface (API) for the application program to access the DBMS and its datastores, and the OTMA allows the application program to create an authorized connection with the DBMS, (c) wherein the Connector includes one or more objects for establishing a connection between the application program and the OTMA, for transmitting transactions from the application program to the DBMS over the established connection between an application program and the OTMA, and for receiving results of the transactions from the DBMS to the application program over the established connection between an application program and the OTMA, and (d) wherein the objects include a Connection Spec bean representing the connection between the application program and the OTMA, as well as the DBMS and its datastores, and an Interaction Spec bean representing the type of interaction that the application program has with the OTMA, as well as the DBMS and its datastores.

30. The article of manufacture of claim 29, wherein the Connector establishes a connection between the application program and the OTMA via a TCP/IP OTMA Connection (TOC).

31. The article of manufacture of claim 30, where the Connector comprises a TOC Connector.

32. The article of manufacture of claim 31, wherein the Connection Spec bean provides information about connection management between the application program and the TOC, as well as the DBMS.

33. The article of manufacture of claim 32, wherein the Connection Spec bean provides information about a TCP/IP connection between the application program and the TOC, as well as the DBMS.

34. The article of manufacture of claim 32, wherein the Connection Spec bean provides information selected from a group comprising:

a TCP/IP hostname of a server computer, and a Port number associated with the DBMS.

35. The article of manufacture of claim 31, wherein the Interaction Spec bean provides information about the interaction between the application program and the TOC, as well as the OTMA and DBMS.

36. The article of manufacture of claim 35, wherein the Interaction Spec bean provides information selected from a group comprising:

- a Datastore same that identifies a name of the datastore,
- an LTerm Name that identifies a name of a logical terminal,
- a Map Name that identifies output from a transaction,
- a Mode that identifies a type of interaction to be carried out between the application program and the DBMS,
- a Sync Level that specifies a transaction synchronization level between the application program and the DBMS.

37. The article of manufacture of claim 31, wherein the TOC Connector further comprises one or more of the objects selected from a group comprising:

- a Communication bean representing the communications between the application program and the TOC, as well as the DBMS and its datastores,
- a Logon Info bean representing logon information for the duration of a session between the application program and the TOC, as well as the DBMS and its datastores, and
- at least one bean for processing potential error messages returned from the DBMS to the application program.

38. The article of manufacture of claim 37, wherein the error messages are DFS messages.

39. The article of manufacture of claim 37, wherein the beans for processing potential error messages are used to handle differently formatted error messages.

40. The article of maunfacture of claim 29, wherein the application program includes one or more of the objects selected from a group comprising:

- a Record Selector bean that discriminates between normal input/output messages and error messages,
- an Input Message bean representing the input to the transaction, and
- an Output Message bean representing the output from the transaction.

41. The article of manufacture of claim 40, wherein the Input Message bean is generated from one or more COBOL source files that contain definitions of the transactions.

42. The article of manufacture of claim 40, where the Output Message bean is generated from one or more COBOL source files that contain definitions of the transactions.

* * * * *

UNITED STATES PATENT AND TRADEMARK OFFICE
CERTIFICATE OF CORRECTION

PATENT NO.   : 6,539,383 B2                                              Page 1 of 1
DATED        : March 25, 2003
INVENTOR(S)  : Kyle Jeffrey Charlet et al.

It is certified that error appears in the above-identified patent and that said Letters Patent is hereby corrected as shown below:

<u>Column 8,</u>
Line 27, "our" should read -- out --

<u>Column 10,</u>
Line 10, "at" should read -- a --

<u>Column 11,</u>
Line 10, "same" should read -- Name --

<u>Column 12,</u>
Line 21, "where" should read -- wherein --

Signed and Sealed this

Twenty-sixth Day of August, 2003

JAMES E. ROGAN
*Director of the United States Patent and Trademark Office*